Figure 1:
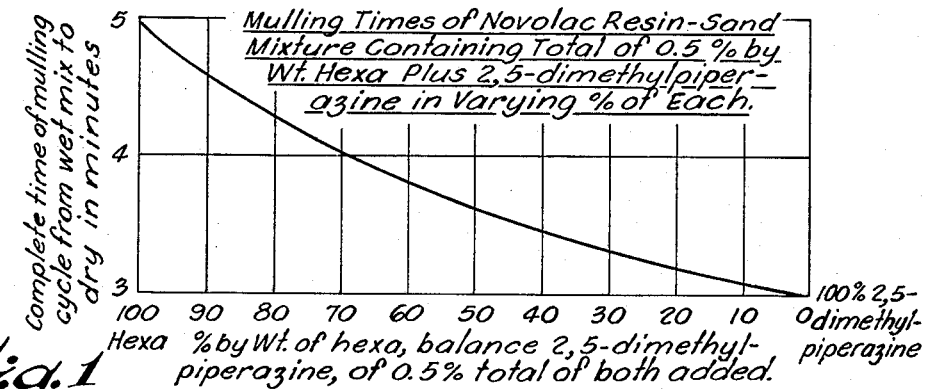

Jan. 21, 1964 R. H. COOPER 3,118,850
SELF-SETTABLE SAND-PHENOLIC RESIN COMPOSITION CONTAINING
2,5-DIMETHYLPIPERAZINE AND MOLDED ARTICLE MADE THEREFROM
Filed July 7, 1960 2 Sheets-Sheet 1

INVENTOR.
Ronald H. Cooper
BY
C.W. Carlin
ATTORNEY

INVENTOR.
Ronald H. Cooper
BY
C.W. Carlin
ATTORNEY

United States Patent Office 3,118,850
Patented Jan. 21, 1964

3,118,850
SELF-SETTABLE SAND-PHENOLIC RESIN COMPOSITION CONTAINING 2,5-DIMETHYLPIPERAZINE AND MOLDED ARTICLE MADE THEREFROM
Ronald H. Cooper, Clare, Mich., assignor to The Dow Chemical Company, Midland, Mich., a corporation of Delaware
Filed July 7, 1960, Ser. No. 41,400
13 Claims. (Cl. 260—38)

The invention is in the field of sand-phenolic resin compositions and articles made therefrom, particularly molds and cores used in the casting of metal.

Among the materials used in the manufacture of compositions which may be molded into desired shapes and which thereafter set autogenously to hard serviceable articles are those comprising sand or other substantially non-adhesive material intermixed with a resinous binder which may be either a liquid or a thermoplastic powder when mixed and which subsequently sets, usually by subjecting it to the action of advanced temperatures, to a hard resin which binds the particles of sand or the like together.

Compositions of such material as intimate mixtures of sand and a resinous binder have a variety of uses including articles that are advantageously porous, e.g. filters and diffusion beds, and molds and cores useful for casting metal.

A particularly important use for compositions of sand and phenolic resin is the manufacture of shell molds. One method of manufacturing shell molds is to prepare a mixture of sand and a thermoplastic resin and then cause the mixture thus prepared to fall upon a heated metal pattern. The heat of the pattern causes the resin to flow and bind the grains of sand so that a thin partially-cured shell is formed over the surface of the pattern. As soon as the shell has attained a desired thickness, the pattern is inverted and surplus sand falls away. The shell and pattern are then transferred to an oven where the resin is cured and the shell thereafter stripped from the pattern. The shell mold is usually made in mating halves so that the halves may subsequently be cemented or clamped together for use in metal casting.

The sand employed is foundry grade sand as described in the art of core and mold making, e.g. publications of the American Foundrymen's Society (AFS), Chicago, Illinois, in which such sands are classified by AFS numbers. Sands having an AFS number of between 50 and 150 are satisfactory for the practice of the invention.

The resin commonly employed in the manufacture of sand-resin shell molds is the phenolic type resin because of certain advantages it offers over other type resins, e.g. the alkyd or epoxy type resins. The invention, accordingly, is directed to the use of phenolic type resins and particularly the phenol-aldehyde resins which are a condensation product of an aryl compound containing the phenyl hydroxy group and an alkyl compound containing the formyl group.

The phenol-aldehyde resin employed may be either (1) a stage A, or resole resin, prepared by reacting an aldehyde, usually formaldehyde, with phenol in a molar ratio of more than 1 but less than 2 moles of the aldehyde per mole of phenol in the presence of a base catalyst and which undergoes hardening or becomes thermosetting when subjected to a sufficiently high temperature or (2) a novolac resin prepared by reacting an aldehyde, usually formaldehyde, and a phenol in a molar ratio of not more than 1 mole of the aldehyde per mole of phenol, most commonly in the presence of an acid catalyst, to produce a thermoplastic resin which is subsequently rendered thermosetting by admixing therewith additional aldehyde or a formyl group donor or source material and subjecting the thus treated mixture to an advanced temperature. Either the stage A resin or the novolac may be termed a prepolymer and such term is sometimes used hereinafter.

A mole ratio of formaldehyde to phenol which is commonly used in the preparation of a stage A resin is from 1.42–1.45. A mole ratio of formaldehyde to phenol commonly employed in the preparation of a novolac resin is about 0.8. The use of the stage A type resin is often referred to as a "one-step" method since the resin carries sufficient formaldehyde to set when subjected to the requisite temperature. The use of the novolac resin is often referred to as a "two-step" method since additional aldehyde or an aldehyde donor must be added to the sand-resin mixture to effect setting when heated. Either the stage A resin or the novolac may be conveniently dissolved or dispersed in alcohol for convenience and when so dispersed is often referred to as an alcohol-borne resin. The stage A resin is sometimes dissolved or dispersed in water and is then described as a water-borne resin.

The proportional parts of resin to sand employed in preparing a sand-resin mixture for making shell molds and cores varies, but is usually between about 2 and 10 parts by weight of resin per 100 parts of sand and more often is between 3.5 and 8 parts of resin per 100 parts of sand. Hexamethylenetetramine, a cyclic nitrogen-containing product, prepared by reacting a mole ratio of formaldehyde to ammonia of 1.5, and which decomposes at advanced temperatures, is frequently employed as a catalyst when using a stage A phenolic resin and is always employed (unless some other additional aldehyde source is provided) as a sort of combined formyl group donor and catalyst when a novolac resin is employed in the sand-resin mixture. Drying agents, e.g. MgO, are frequently employed in preparing the sand-resin mixture prior to molding. However, the percent of MgO present must not be too large or an adverse effect upon the tensile strength occurs.

Although a mixture of sand and a phenolic resin have been shown to be especially suitable for a number of uses including the manufacture of shell molds, improvements in their use and in the articles made therefrom are needed. For example, in the making of molds of such a mixture, the mixture must be mixed well to provide a substantially dry free-flowing material prior to molding and curing. A need exists for an improved drying agent to decrease the drying time necessary without objectionable accompanying effects. There is also a need for a catalytic agent which lessens or eliminates the need for hexamethylenetetramine, which has an undesirable effect on the skin and gives off obnoxious fumes especially when heated. There is a further need for such drying and catalytic agent which may be used in conjunction with such known useful additaments as hexamethylenetetramine and MgO to serve as a supplement thereto.

The invention meets these and similar needs by providing an improved method of preparing a sand-phenolic resin composition, the improved composition thus made, and molded articles formed therefrom. The annexed drawing, consisting of FIGURES 1–5, shows graphically the advantages of employing recommended percentage compositions in accordance with the invention.

The invention, therefore, is a novel resin preparation for admixture with foundry grade sand to make an improved sand-resin composition suitable for subsequent shaping and curing into molds, the improved composition so made, and the molded article made therefrom which consists of admixing between 1 and 20 percent, more commonly between 5 and 12 percent (based on the weight of said resin), of 2,5-dimethylpiperazine and a thermoplastic phenolic-aldehyde resin, which becomes a bond-forming thermosetting resin when subjected to an elevated temperature in the presence of sufficient aldehyde forming bonds, and a suitable grade foundry grade sand. The 2,5-dimethylpiperazine need not be admixed with the resin, however, prior to admixing the sand; if desired, the sand and resin, and other conditioning agents if employed, may be first intimately mixed before adding the 2,5-dimethylpiperazine, or all the ingredients including the 2,5-dimethylpiperazine may be admixed together in one step.

The phenolic resin employed in the practice of the invention may be either a stage A resin or novolac resin, as described briefly above. The stage A resin may be employed in a liquid state at substantially 100 percent concentration or as a solution in a suitable solvent, e.g. water or alcohol. The novolac resin may be employed as a dry powder or as an alcohol solution thereof.

To make a molded article, e.g. a core or mold for use in casting metals, in accordance with the practice of the invention, a suitably shaped metal pattern (usually of gray iron, steel, or aluminum and usually coated with a mold-release agent, e.g. a silicone oil such as Dow-Corning DC 7 Emulsion in water) is heated to between about 250° and 500° F. Suitable proportions of foundry sand, phenolic resin, 2,5-dimethylpiperazine are usually well mixed in a suitable mixer, e.g. a muller, to form a curable free-flowing sand-resin mixture which is then placed, usually dropped, onto the heated pattern. Heat from the pattern causes the resin to flow and surround sand grains adjacent to the pattern thereby forming a thin, partially cured shell which conforms to the contour of the pattern. A contrivance known as a "drop box" is commonly used which provides a means for inverting the pattern thereafter to remove excess sand-resin mixture. The conforming shell, adhering to the pattern, is placed in an oven for curing at a temperature of between about 500° and 1200° F., usually between 600° and 800° F., for a period of time sufficiently long for cure to take place. The cure time is dependent upon a number of conditions among which are the curing temperature, the resin composition, the ratio of sand to resin, and the thickness of the shell being cured. A time between 1 minute and about 10 minutes is usually employed for curing the shell mold.

It is advantageous to warm the sand prior to mixing with the resin, a temperature of from 150° to 300° F. and preferably of from 180° to 250° F., being recommended. Such heating is particularly advantageous when employing a novolac resin, whether as a powder or an alcoholic solution thereof. It is also advantageous to admix small amounts of a lubricant or a plasticizer such as paraffin, carnauba wax, or a synthetic wax, e.g. Acrawax, containing octadecenamide. When such plasticizer is employed, it seldom exceeds about 0.2 weight percent and more often not over about 0.1 weight percent of the sand-resin composition. The mixing time employed in the practice of the invention is that sufficient to produce a dry free-flowing sand-resin mixture. The total mulling time employed is usually from 3 to 5 minutes. Generally speaking, the higher the percent of 2,5-dimethylpiperazine, the shorter the mulling time.

Hexamethylenetetramine may be used, similarly to conventional practice, in the practice of the invention, when employing a stage A resole resin, but its use with such resin in the practice of the invention is unnecessary. It (or an equivalent formaldehyde-donor) must be used, however, in the practice of the invention when a novolac-type resin is used but the amount necessary is only that sufficient to provide enough methylene bridges or linkages to make a thermosetting resin; an excess thereof for its catalytic effect, as commonly used in conventional practice, is not necessary. Up to 10 percent of hexamethylenetetramine based upon the weight of novolac resin is recommended in the practice of the invention although up to 15 percent may be used, especially when the formaldehyde ratio to phenol is less than 0.8 mole to 1. The elimination or reduction of the need for higher amounts of hexamethylenetetramine, however, in the practice of the invention is highly desirable.

Magnesium oxide, as aforestated, may be employed in the practice of the invention. It is usually employed in an amount of between 10 and 25 percent by weight of the resin employed. Other compounds having a similar effect, e.g. magnesium oxysulfate and magnesium oxychloride may be employed, as described in U.S. Patent 2,869,194.

To show the practice of the invention, test examples illustrative thereof and others for comparative purposes, were run wherein test cores were prepared employing sand-resin compositions described hereinbelow. The test cores prepared were of a type commonly employed as a standard for testing purposes. They were formed in Tensile Core Box No. 610–1, procured from the Harry W. Dietert Company of Detroit, Michigan. These cores are somewhat of the shape of a figure 8 or of a type resembling a compressed commercially available dog-food preparation commonly referred to as a "dog bone"; accordingly, such cores are spoken of in the art as "figure 8" or "dog bone" cores. They are 3 inches in overall length and consists of enlarged ends extending about 1 inch from each end in a tapering manner to form a 1-inch square intermediate shank therebetween about 1 inch long. The cores thus formed of the composition described below, after cure, were tested in a Universal Sand Strength Machine, procurable also from the Dietert company.

Figure 2:
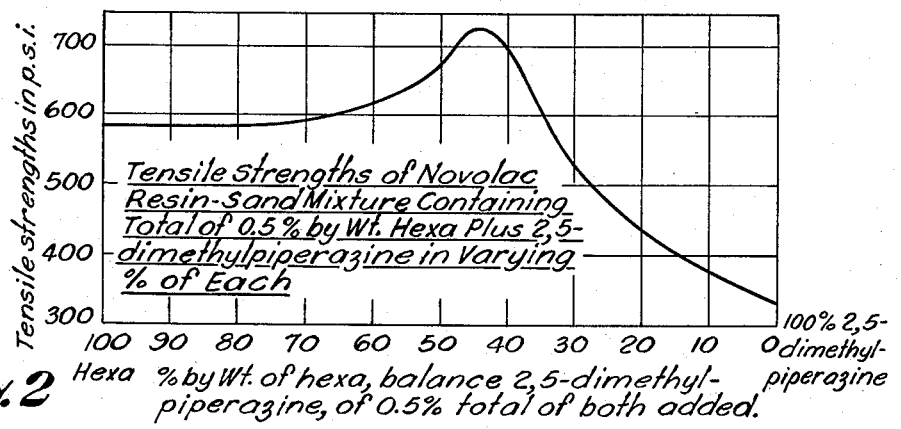

A first series of examples was run wherein fixed weight percents, as set out in Table I, of each of a 70 percent alcohol solution of phenolic novolac resin, Vassar Bank sand (AFS No. 100), and the total or combined percents of the hexamethylenetetramine (hereinafter called hexa) plus 2,5-dimethylpiperazine were employed without change. The relative weights of hexa and 2,5-dimethylpiperazine, however, were varied, as graphically shown in percent on the abscissa of FIGURES 1 and 2 of the drawing, ranging from 100 percent hexa to 100 percent 2,5-dimethylpiperazine. The percent composition, the mulling and curing times, and the tensile strength of test cores made at the different curing times are shown in Table I below. The graph of FIGURE 1 shows the mulling times required and that of FIGURE 2 shows the average tensile strength values, obtained from 6 runs employing the 2 minute curing time, on the ordinates thereof, respectively. The procedure employed was to heat the sand to 275° F., blend therein the hexa and/or 2,5-dimethylpiperazine and a small amount of Acrawax to serve as a lubricant and mix in a muller until a substantially free-flowing dry mixture was obtained which was thereafter molded, as above described, into test cores, and cured at about 600° F. for the time given in Table I.

Table I

| Test No. | Percent by weight composition | | | | Mulling Time in Minutes[2] | Tensile strength, in p.s.i., of test cores at various cure times in minutes | | | | |
|---|---|---|---|---|---|---|---|---|---|---|
| | Novolac resin solution | Hexa[1] | 2,5-dimethylpiperazine[1] | Vassar Bank Sand | | $1\frac{1}{2}$ | $1\frac{3}{4}$ | 2[3] | $2\frac{1}{2}$ | 3 |
| 1 | 5 | 0.50 | none | 94.50 | 5 | 640 | 630 | 580 | 570 | 530 |
| 2 | 5 | 0.43 | 0.07 | 94.50 | 4.5 | 570 | 570 | 588 | 560 | 500 |
| 3 | 5 | 0.36 | 0.14 | 94.50 | 4 | 600 | 610 | 595 | 570 | 480 |
| 4 | 5 | 0.22 | 0.28 | 94.50 | 3.5 | 750 | 690 | 722 | 680 | 590 |
| 5 | 5 | 0.15 | 0.35 | 94.50 | 3.25 | 670 | 630 | 522 | 590 | 540 |
| 6 | 5 | none | 0.50 | 94.50 | 3.0 | 200 | 250 | 330 | 300 | 200 |

[1] The combined weights of hexa and 2,5-dimethylpiperazine were maintained in all runs at 0.5 percent of the total weight of the composition or 10 percent of the resin.
[2] The mulling times are plotted on Figure 1 of the drawing.
[3] Each value set out for 2 minute cures are the average of six separate tensile strength values. These values are plotted on Figure 2 of the drawing.

Referring to FIGURE 1, it can be seen that the mulling time necessary to produce a free-flowing sand-resin composition for molding is consistently lessened as the 2,5-dimethylpiperazine is increased and the hexa is decreased. Referring to FIGURE 2, it can be seen that up to about 35 percent 2,5-dimethylpiperazine may be used (thereby replacing an equal percent of the offensive hexa) and that a synergistic effect is obtained when both 2,5-dimethylpiperazine and hexa are employed in amounts of between about 65 percent of the 2,5-dimethylpiperazine and 35 percent hexa on the one hand and 35 percent 2,5-dimethylpiperazine and 65 percent hexa on the other hand. It further shows that a percentage of between about 50 percent 2,5-dimethylpiperazine and 50 percent hexa on the one hand and 60 percent 2,5-dimethylpiperazine and 40 percent hexa on the other, results in particularly high tensile strength values.

Figure 3:
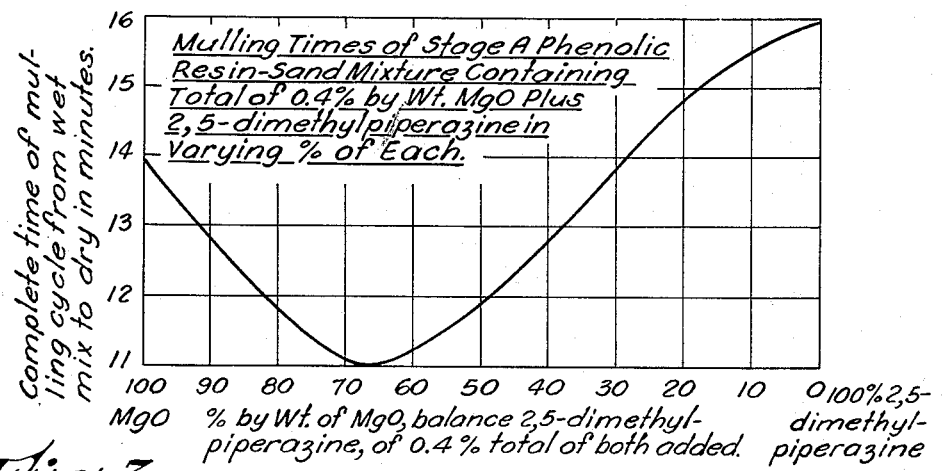
Figure 4:
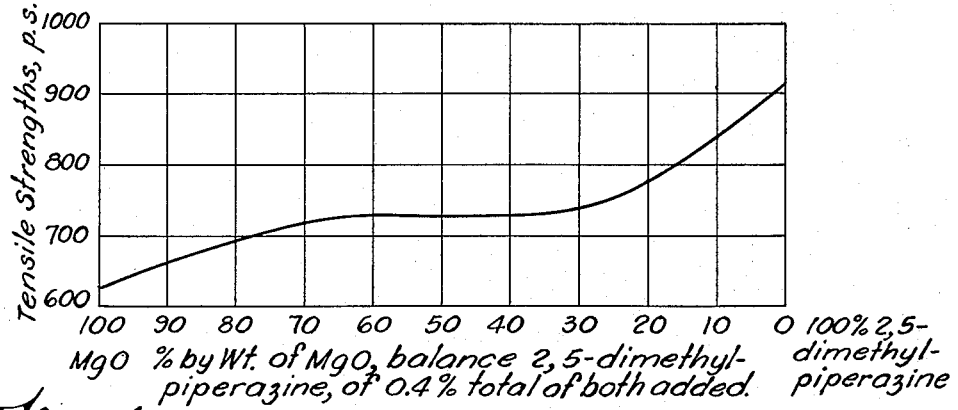
Figure 5:
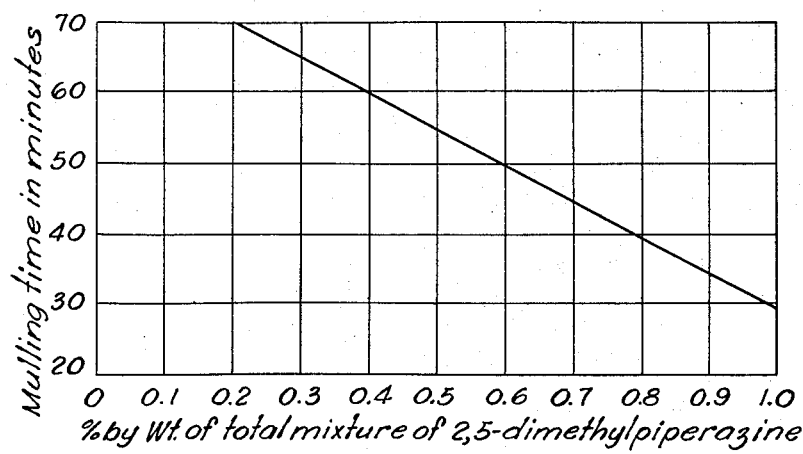

A second series of runs was made wherein fixed percents, as set out in the footnotes to Table II, of each of a 70 percent aqueous solution of a stage A phenolic resin, Ottawa sand (AFS No. 80), and combined percents of 2,5-dimethylpiperazine and MgO were employed. The stage A resin consisted of a molar ratio of 1.4 formaldehyde to 1 mole of phenol. The percent by weight of each of the 2,5-dimethylpiperazine and MgO was varied, as graphically shown on FIGURES 3 and 4 of the drawing, from 100 percent MgO to 100 percent 2,5-dimethylpiperazine. The percent composition, the mulling and curing times, and the tensile strength of test cores made at the different curing times are shown in Table II below. FIGURE 3 shows the mulling times required and FIGURE 4 shows the average tensile strength values obtained from six test cores made, employing the 2 minute curing time. The procedure was substantially that followed in series one above including the addition of a small percent of Acrawax as a lubricant.

moldable composition which can be subsequently formed and cured by conventional means to produce cores and molds of satisfactory tensile strength.

Another series of runs was made to observe the effect of the presence of the 2,5-dimethylpiperazine in the sand-resin composition in accordance with the invention, employing 4.0% by weight of a 70% alcohol solution of the stage A phenol-formaldehyde resin, of the type employed in the second series of runs above, and 96% Ottawa sand. No hexamethylenetetramine was present as in the runs shown in FIGURE 1 (wherein a novolac resin-sand mixture was employed) nor MgO was present as in the runs shown in FIGURE 3. The results of this series of runs are shown graphically in FIGURE 5. By reference thereto it can be seen that the required mulling time required for a resin-sand mixture containing 2,5-dimethylpiperazine decreases in a straight-line relationship as the amount of 2,5-dimethylpiperazine is increased from 0.2 to 1.0% based on the resin-sand weight.

Having described my invention, what I claim and desire to protect by Letters Patent is:

1. A moldable composition, settable by heat to a form-retaining solid, comprising by weight 100 parts of foundry grade sand, between 2 and 10 parts of a thermoplastic phenol-aldehyde resin, which becomes a bond-forming thermosetting resin when subjected to an elevated temperature, selected from the class consisting of (1) liquid and aqueous and alcohol solutions of a stage A resole resin containing a molar excess of formyl groups and (2) novolac resin in the presence of a formyl group donor, and between 1 and 20% by weight of said phenol-aldehyde resin of 2,5-dimethylpiperazine.

2. The moldable composition of claim 1 wherein said foundry grade sand has an AFS number of between about 50 and about 150 and said resin is employed in an amount

Table II

| Test No. | Percent by weight composition | | | | Mulling Time in Minutes[2] | Tensile strength, in p.s.i., of test cores at various cure times in munutes | | | | |
|---|---|---|---|---|---|---|---|---|---|---|
| | Stage A, resin solution | MgO[1] | 2,5-dimethylpiperazine[1] | Ottawa sand | | $1\frac{1}{2}$ | $1\frac{3}{4}$ | 2[3] | $2\frac{1}{2}$ | 3 |
| 7 | 4.0 | .4 | 0 | 95.6 | 14 | 470 | 680 | 628 | 650 | 600 |
| 8 | 4.0 | .33 | .07 | 95.6 | 13 | 700 | 710 | 696 | 660 | 660 |
| 9 | 4.0 | .26 | .14 | 95.6 | 12 | 660 | 700 | 728 | 700 | 580 |
| 10 | 4.0 | .12 | .28 | 95.6 | 14 | 770 | 660 | 740 | 890 | 890 |
| 11 | 4.0 | 0 | .4 | 95.6 | 16 | 830 | 1,000 | 912 | 890 | 780 |

[1] The combined weights of MgO and 2,5-dimethylpiperazine were maintained in all runs at 0.4 percent of the total weight of the composition or 10 percent of the weight of the resin.
[2] The mulling times azre plotted on Figure 3 of the drawing.
[3] Each value set out for 2 minute cures are the average of six separate tensile strength values. These values are plotted on Figure 4 of the drawing.

Table II, when examined in reference to FIGURES 3 and 4 of the drawing, shows that the use of 2,5-dimethylpiperazine in combination with MgO in sand-phenolic resin compositions clearly lessens the mulling time necessary to give a substantially dry free-flowing sufficient to provide by weight of between about 3.5 and about 8.0 parts thereof per 100 parts of the sand.

3. The moldable composition of claim 2 wherein the 2,5-dimethylpiperazine is present in an amount between about 5 and about 12% by weight of said resin.

4. The moldable composition of claim 3 wherein MgO is present in an amount sufficient to provide between 1 and 20% by weight of the resin present.

5. The moldable composition of claim 4 wherein the MgO employed is between about 40 and 90% by weight of the total combined weights of 2,5-dimethylpiperazine and MgO present.

6. The moldable composition of claim 3 wherein said resin is a phenol-formaldehyde stage A resole resin.

7. The moldable composition of claim 6 wherein the phenol-formaldehyde stage A resole resin was prepared by reacting a formaldehyde and phenol monomeric mix in a molar ratio of formaldehyde to phenol of between about 1.42 and about 1.45.

8. The moldable composition of claim 3 wherein said resin is a novolac resin.

9. The moldable composition of claim 8 wherein the novolac resin was prepared by reacting a formaldehyde and phenol monomeric mix in a molar ratio of formaldehyde to phenol of between about 0.8 and 1.0.

10. The moldable composition of claim 9 wherein the formyl group donor is hexamethylenetetramine.

11. The moldable composition of claim 10 wherein the hexamethylenetetramine is employed in an amount sufficient to yield, when heated to its decomposition temperature, a molar excess of formyl groups to phenol groups.

12. The moldable composition of claim 11 wherein the hexamethylenetetramine is present in an amount sufficient to provide between 35 and 65 weight percent of the combined weight of the 2,5-dimethylpiperazine and hexamethylenetetramine employed.

13. A substantially rigid article of manufacture of improved strength properties adaptable for use as a mold consisting of the composition of claim 1 which has been formed into the desired shape and heat-cured at a temperature of between 500° F. and 1200° F. for from about 1 to about 10 minutes.

References Cited in the file of this patent
UNITED STATES PATENTS

| | | |
|---|---|---|
| 2,869,194 | Cooper | Jan. 20, 1959 |
| 2,935,488 | Phillips et al. | May 3, 1960 |
| 3,036,041 | Tarbell | May 22, 1962 |